United States Patent
Egawa

4,217,048
Aug. 12, 1980

[54] VIEWFINDER CAPABLE OF ADJUSTING DIOPTER

[75] Inventor: Takeshi Egawa, Sennan, Japan

[73] Assignee: Minolta Camera Kabushiki Kaisha, Osaka, Japan

[21] Appl. No.: 20,170

[22] Filed: Mar. 13, 1979

[30] Foreign Application Priority Data

Mar. 24, 1978 [JP] Japan .................................. 53/34718

[51] Int. Cl.² .......................... G02C 7/08; G02C 7/14; G03B 13/02

[52] U.S. Cl. ................................ 354/155; 350/175 E; 351/34; 354/199

[58] Field of Search ....................... 350/43, 175 E, 230, 350/255; 354/155, 199; 351/34

[56] References Cited

U.S. PATENT DOCUMENTS

| | | | |
|---|---|---|---|
| 1,680,534 | 8/1928 | Garbutt et al. | 350/287 |
| 2,503,789 | 4/1950 | Wood et al. | 350/255 |
| 3,240,107 | 3/1966 | Prister | 350/175 E |
| 3,695,750 | 10/1972 | Baker | 350/255 |
| 3,926,504 | 12/1975 | Fleischman | 350/255 |
| 4,113,363 | 9/1978 | Humphrey | 351/34 |
| 4,145,108 | 3/1979 | Itaya | 351/34 |

FOREIGN PATENT DOCUMENTS 2518457  11/1975  Fed. Rep. of Germany ........... 350/255

OTHER PUBLICATIONS

American Journal of Opthalmology vol. 48 No. I (Part II) 7/1959 pp. 118–121.

*Primary Examiner*—L. T. Hix
*Assistant Examiner*—Shelley Wade
*Attorney, Agent, or Firm*—Jackson, Jones & Price

[57] ABSTRACT

An improved eyepiece for a viewfinder of a single lens reflex camera is provided. This improved eyepiece is capable of adjusting both the diopter and astigmatism correction to the demands of the individual user. The eyepiece includes a negative meniscus lens element convex to the object side and a stationary positive lens element. As the negative lens element is movable along the optical axis it adjusts the diopter of the viewfinder. A pair of relatively rotatable prisms is capable of providing variable astigmatism correction.

13 Claims, 12 Drawing Figures

FIG.7a
Astigmatism

FIG.7b
Distortion

FIG.7c
Lateral Chromatic Aberration

FIG.7d
Coma (image height = -18)

FIG.8a
Astigmatism

FIG.8b
Distortion

FIG.8c
Lateral Chromatic Aberration

FIG.8d
Coma (image height = -18)

FIG.9a
Astigmatism

FIG.9b
Distortion

FIG.9c
Lateral Chromatic
Aberration

FIG.9d
Coma (image height=-18)

FIG.10a
Astigmatism

FIG.10b
Distortion

FIG.10c
Lateral Chromatic
Aberration

FIG.10d
Coma (image height=-18)

FIG.11a
Astigmatism

FIG.11b
Distortion

FIG.11c
Lateral Chromatic Aberration

FIG.11d
Coma (image height=-18)

FIG.12a
Astigmatism

FIG.12b
Distortion

FIG.12c
Lateral Chromatic Aberration

FIG.12d
Coma (image height=-18)

VIEWFINDER CAPABLE OF ADJUSTING DIOPTER

BACKGROUND OF THE INVENTION

1. Field of the Invention

This invention relates in general to an improvement in an eyepiece for adjusting diopter and more specifically to an improvement in viewfinders for single lens reflex cameras for adjusting diopter.

2. Description of the Prior Art

In binoculars, microscopes and viewfinders of optical instruments and the like, the image formed at a given position by the optical system is generally observed with the eye. A large number of people have limited and variable focussing powers. For example, since a viewfinder for a single lens reflex camera is generally standardized to form images about −1 diopter (one meter ahead of the eye), it is often difficult for nearsighted, far-sighted or presbypopic persons to observe an image formed one meter in front of the eye through an unaided or naked eye. This leads to obvious difficulties in focussing a single lens reflex camera. While employment of spectacles avoids such problems with diopter, there is a likelihood that the visual field is eclipsed and is hard to be seen because the eye is held away from the eyepiece by the spectacles in front of the eye. Additionally, the contrast of the image scene is lessened by the introduction of ambient light. Several approaches have been suggested to provide diopter adjustment and also to adjust the position of an image in optical instruments in conformity to the individual difference in the adjusting faculties of the eye. One typical method is to move the eyepiece along the optical axis and this method has been actually practiced in the viewfinders of cine-cameras, binoculars, microscopes or the like. As a rule, if an eyepiece of focal length f is displaced by $\Delta d$, then the amount of varying diopter can be represented in terms of $1000\Delta d/f^2$ diopters. It is, accordingly, clear that a slight amount $\Delta d$ of movement results in wide variations in diopter with eyepieces of a short focal length.

Additionally, in order to make an eyepiece movable to adjust diopter, there is a necessary space requirement for permitting movement in optical instruments. In view of the foregoing, the above mentioned means for adjusting diopter by movement of the eyepiece are effective only in optical instruments where the focal length of the eyepiece was relatively short or there was sufficient room for movement of the eyepiece.

Within a viewfinder for a single lens reflex camera, an image of an object formed on an objective lens and projected on a focussing glass plate is generally magnified for viewing by an eyepiece having a positive refracting power so that focal length of the eyepiece must be longer than the length of an optical path between the eyepiece and the focussing plate. However, a penta prism has to be interposed for reversal of an image between the focussing plate and the eyepiece in a conventional viewfinder of a single lens reflex camera. In the case of a 35 mm single lens reflex camera for example, the optical path length refined above is normally longer than 50 mm. Therefore, the focal length of the eyepiece is about 55-70 mm. Since a sufficient latitude of approximately 2 diopter is needed to overcome individual difference in diopter, analysis of the above diopter variations shows that the eyepiece should be moved within a range of about 6-10 mm in order to ensure a diopter latitude of 2 diopter when the focal length of the eyepiece is about 55-70 mm. However, in the case of a 35 mm single lens reflex camera, space for placement of the eyepiece behind the penta prism is too limited to allow movement of the eyepiece. Furthermore, a greater movement of the eyepiece results disadvantageously in an increasing rate of change in viewfinder magnification. These were the reasons why the prior art in the 35 mm single lens reflex cameras field failed to adjust diopter continuously. It is known that a successful prior art application was to selectively place adjustment lenses behind the eyepiece in accordance with the individual difference for the purpose of adjusting diopter. Nevertheless, this prior art approach needed several kinds of attachment lenses and had inherent difficulties in that the necessary visual field was partially eclipsed and hardly visible because of the positioning of the attachment lens behind the eyepiece.

SUMMARY OF THE INVENTION

It is, therefore, an object of the present invention to provide an eyepiece which is free of the above prior art problems and suitable for a diopter adjustment for an optical system of a viewfinder wherein the focal length of the eyepiece is relatively long and the space for its location is limited.

It is another object of the present invention to provide a novel viewfinder with faculties of adjusting the diopter for use in single lens reflex cameras and also to compensate for strabismus of the eye.

The present invention provides, in a viewfinder having a positive refractive power, an improved eyepiece comprising a negative lens element movable in the viewfinder along the optical axis thereof and a positive lens element located stationary at the eye side of the negative lens element. The diopter of the viewfinder being adjustable by axial movement of the negative lens element.

The objects and features of the present invention which are believed to be novel are set forth with particularly in the appended claims. The present invention, both as to its organization and manner of operation, together with further objects and advantages thereof, may best be understood by reference to the following description, taken in connection with the accompanying drawings.

DESCRIPTION OF THE PREFERRED EMBODIMENTS

The following specification taken in conjunction with the drawings sets forth the preferred embodiment of the present invention in such a manner that any person skilled in the optical field can reproduce the same. The present invention will be described in detail by reference to the accompanying drawings.

Figure 1:
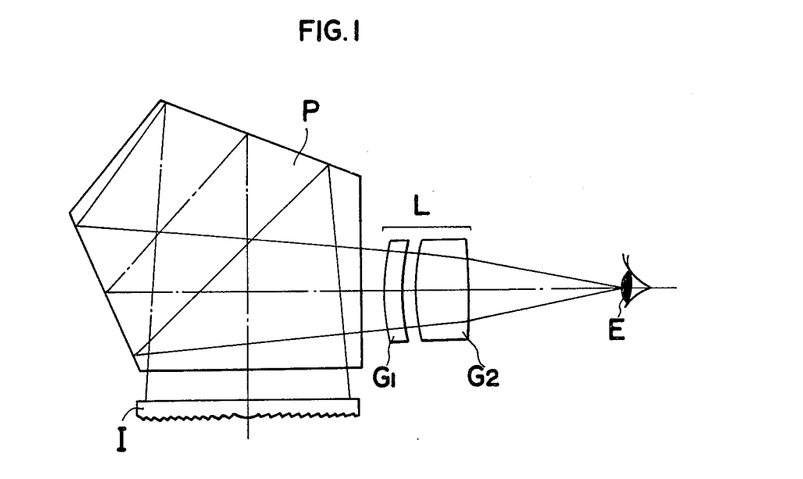
FIG. 1 is a cross-sectional view of the preferred embodiment of the present invention.

Referring now to FIG. 1, there is illustrated a cross-sectional view of the viewfinder of a 35 mm single lens reflex camera in one preferred form of the present invention. A focussing plate is labeled I, a penta prism is labeled P and an eyepiece is labeled L. The eye is labeled E. The eyepiece L has an overall positive refracting power and consists of a negative lens $G_1$ and a positive lens $G_2$ in sequence from the object side. The positive lens $G_2$ is fixed in a desired position with respect to the penta prism P, by a well-known method. The negative lens $G_1$, on the other hand, is shiftable along the optical axis thereof with respect to the positive lens $G_2$ for adjusting diopter.

Figure 2:
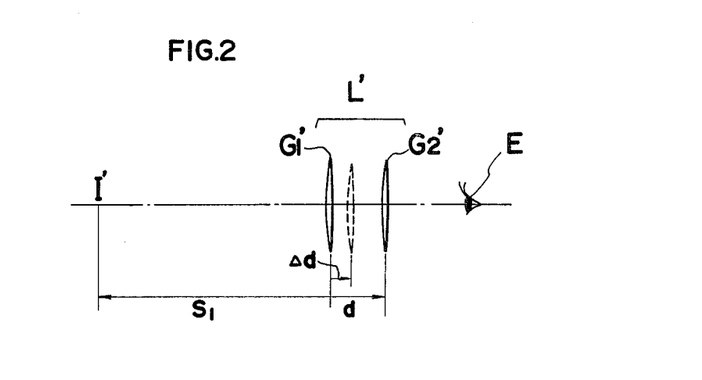
FIG. 2 is an illustrative diagram showing the principle of the present invention.

The following description discusses the above stated lens arrangement in greater detail. In FIG. 2, an eyepiece L' having a positive refracting power as a whole is divided into a pair of lenses $G_1'$ and $G_2'$ with $G_2'$, at the eye side, stationary and $G_1'$ at the object side, shiftable along the optical axis. The illustration in FIG. 2 is disclosed as a thin lens system in the paraxial region. A primary optical system, closer to the object side than the eyepiece L', forms a final image at the position I' where, for example, the focussing glass plate can be located. The distance from $G_1'$ to I' (in the negative direction) is denoted by $S_1$ and the distance from $G_1'$ to $G_2'$ is denoted by d.

Figure 3:
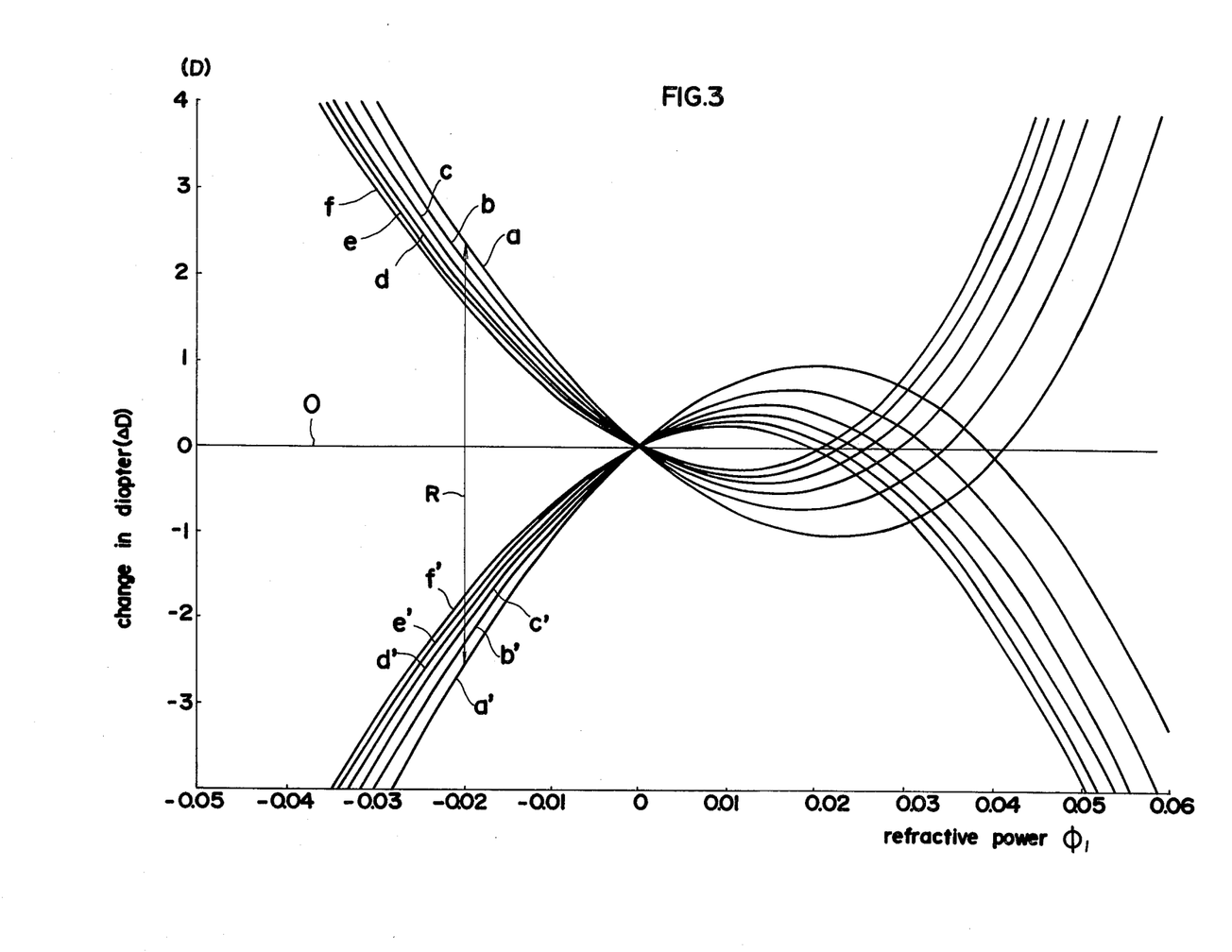
FIGS. 3 and 4 are respectively graphic representations showing the principle of the present invention.

If in the positions as denoted by the solid line in FIG. 2, a refracting power of the lens $G_1'$ is selected at the designer's option and a refracting power of the lens $G_2'$ is evaluated in a manner to form a virtual image of I' via the whole of the eyepiece L', in the same position, e.g., 1 meter from the lens $G_1'$ at the object side thereof, at all times, then several exemplary examples will be available where a refracting power of the lens $G_1'$ is different but diopter is identical with respect to the whole eyepiece L'. FIG. 3 depicts how diopter changes in different examples when the lens $G_1'$ is shifted along the optical axis. In the graph of FIG. 3 the numbers on the abscissa represent the refracting power, $\Phi_1$, of the lens $G_1'$ and the numbers on the ordinate represent changes in diopter. The straight line 0 indicates that, while the refracting power of the lens $G_1'$ assumes various values, the refractive power of the lens $G_2'$ is set so as to give the same diopter of the eyepiece as a whole in the individual examples when the distance d between the lenses $G_1'$ and $G_2'$ is 2.5 mm. In other words, the individual examples are selected under the conditions that diopter is identical in spite of the value of $\Phi_1$ when the d between $G_1'$ and $G_2'$ is 2.5 mm. If $S_1 = -50$ mm, the curve a' depicts how diopter changes with movement $\Delta d = 2.5$ mm of the lens $G_1'$ as shown by the dotted line in FIG. 2 (displacement of 2.5 mm to the eyeside) for the individual examples when the refracting power of the lens $G_1'$ is varied.

When $\Phi_1 = 0$, movement of the lens $G_1'$ along the optical axis causes no change in diopter. From the graph, it is evident that diopter changes according to the value of $\Phi_1$ when $\Phi_1 \neq 0$. The curve a is plotted so that the lens $G_1'$ is shifted $\Delta d = -2.5$ mm (toward the object side) along the optical axis if $S_1 = -50$ mm. Difference in diopter appear in the distance between the curve a and a' in accordance with a selected refracting power of the lens $G_1'$ when the lens $G_1'$ is shifted 5 mm.

For example, changes in diopter when $\Phi_1 = -0.02$ are marked by the arrow R.

Figure 4:
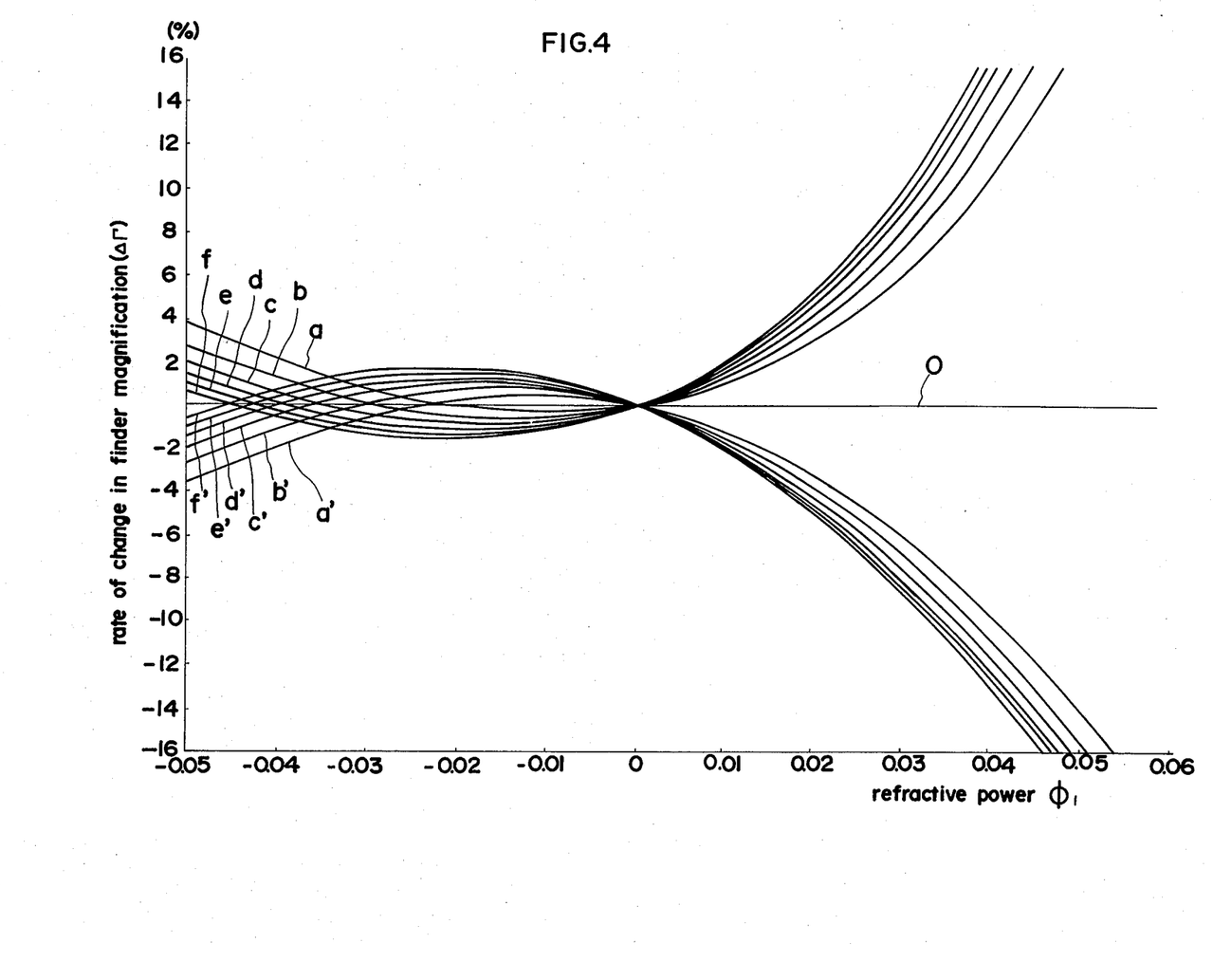

In FIG. 4, there is depicted a rate of change in finder magnification upon movement of the lens $G_1'$ along the optical axis, wherein the numbers on the abscissa represent a refracting power $\Phi_1$ of the lens $G_1'$ and the numbers on the ordinate represent the rate of change in finder magnification $\Delta \Gamma$ as defined as follows:

$$\Delta \Gamma = (\Gamma' - \Gamma_0 / \Gamma_0) \times 100(\%)$$

wherein $\Gamma_0$ is the finder magnification when d between $G_1'$ and $G_2'$ is 2.5 mm (viz. $\Delta d = 0$), and $\Gamma'$ is the finder magnification when the lens $G_1'$ is shifted by $\Delta d$.

In FIG. 4, the curve a' suggests the dependency of the change in magnification upon $\Phi_1$ when the lens $G_1'$ is shifted $\Delta d = 2.5$ mm, whereas the curve a suggests the same when $\Delta d = -2.5$ mm. Correspondingly, a 5 mm movement of the lens $G_1'$ causes changes in magnification as viewed between the curves a and a'. The straight line 0 is illustrated when d=0 as in FIG. 3. It is clear from FIG. 3 that changes greater than 2 diopter are available by shifting the lens $G_1'$ by 5 mm when $\Phi_1 \leq 0.01$ in case of negative $\Phi_1$ or when $\Phi_1 \geq 0.048$ in case of positive $\Phi_1$. FIG. 4, however, clarifies that magnification differs remarkably when $\Phi_1$ is positive. Such a remarkable variation in magnification in case of a positive $\Phi_1$ results in a relatively bulky optical system.

The foregoing graphs illustrate the reasons why the eyepiece is divided into two lenses with one negative and the other positive in sequence from the object side and why the negative lens is shiftable in the present invention. It is unfavorable in terms of aberrations for the positive lens on the object side to be movable. This is because such movement tends to increase changes in astigmatism and coma.

The remaining curves b, b' and so forth in FIGS. 3 and 4 illustrate changes in diopter and magnification for various differences in the distance $S_1$. In particular, the curves b', c', d', e' and f' in FIGS. 3 and 4 are depicted when $S_1$ is $-60$ mm, $-70$ mm, $-80$ mm, $-90$ mm and $-100$ mm, respectively, and $\Delta d$, remains 2.5 mm in each case. The curves b, c, d, e and f, on the other hand, are depicted when $S_1$ is $-60$ mm, $-70$ mm, $-80$ mm, $-90$ mm and $-100$ mm, respectively, and $\Delta d$ is $-2.5$ mm in every case.

Further study is devoted to the case where the movable lens $G_1$ on the object side is negative. FIG. 4 generally teaches that the change in magnification upon movement of lens $G_1'$ is relatively small when $\phi_1$ is negative. However, an excessive negative refracting power of the movable lens $G_1'$ cannot be free from increasing changes in magnification as seen from FIG. 4. Further magnification per se is reduced in case of an excessive negative refractive power of $G_1'$. In many cases finder magnification of a single lens reflex camera is not less than 0.8 times. It is, therefore, undesirable that finder magnification be too low as compared with the above specified value.

It is concluded from the above discussion and detailed analysis of the refracting power of the movable negative lens depicted in FIGS. 3 and 4 that, when $S_1$ is $-50$ mm through $-100$ mm, a refracting power $\Phi_1$ of the movable negative lens is desirably selected in the following relationship in order to cause changes of more than 2 diopter upon less than 5 mm movement of the movable lens.

$$-0.04 \leq \Phi_1 \leq -0.01 \qquad (1)$$

With respect to the positive lens $G_2'$, it should be noted that it is necessary for the eyepiece as a whole to bear a positive focal length longer than $S_1$. Therefore, the refracting power of the positive lens $G_2'$ must be selected to fulfill this requirement.

It is further preferable, in implementing the present invention that the movable negative lens on the object side be a meniscus lens convex to the object side and the movable negative and stationary positive lenses be correlated as below:

$$0 < 1/r_3 \leq 0.045 \qquad (2)$$

$$0.9 \leq r_5/r_4 \leq 1.2 \qquad (3)$$

wherein $r_3$ and $r_4$ are the radii of curvature of the surfaces of the movable negative lens on respectively the object side and the eye side, and $r_5$ is the radius of curvature of the object side surface of the stationary positive lens.

The use of a movable negative lens $G_1'$ in the form of a plano-concave lens or a biconcave lens is disadvantageous because of reduced finder magnification and increased astigmatism and distortion. In addition, the above formula (2) implies that the radius of curvature of the object side surface of the negative meniscus lens should not be too small. In case of a negative meniscus lens convex to the object side, it is generally apparent that the radius of curvature of the eye side concave surface should be still smaller when the radius of curvature of the object side convex surface is smaller. It is noted that such an excessively short radius of curvature of the eye side concave surface renders the eyepiece difficult to manufacture and increases the expense. Therefore, in the case that the refractive power of the negative meniscus lens is selected within the range of the formula (1), the formula (2), $1/r_3 \leq 0.045$ is provided to prevent an excessively short radius of curvature. The formula (3) suggests that the object side surface of the stationary positive lens be convex to the object side with the radius of curvature closely similar to that of the eye side surface of the movable negative lens. A range of $r_5/r_4 < 0.9$ beyond limits of formula (3) is not preferable from the viewpoint of increased astigmatism, coma and lateral chromatic aberration. Disadvantageously, finder magnification is descreased and coma is increased within a range of $r_5/r_4 > 1.2$.

Figure 5:
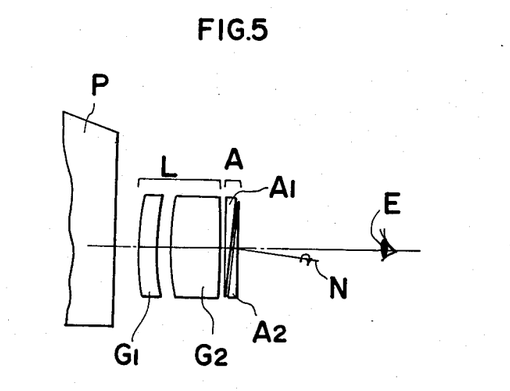
FIG. 5 is a partial cross-sectional view of an embodiment of the present invention.

FIG. 5 discloses another preferred embodiment of the present invention wherein the eyepiece L is constructed as in FIG. 1 and optical member A for compensating an astrabismus eye is further disposed at the back of the eyepiece L. The eye strabismus compensating optical member A comprises similar wedge prisms $A_1$ and $A_2$ wherein their interfacing surfaces are in parallel to each other. The wedge prism $A_2$ is rotatable with respect to the other wedge prism A about a normal line, N, to their interfacing surfaces. The strabismus corrective optical member A, in the position of FIG. 5, serves substantially as a parallel flat plate with no prism effect. The prism effect reaches a maximum when the wedge prism $A_2$ is rotated 180° from the position shown in FIG. 5. Thus, the overall prism effect of the optical member A can be consecutively varied by the relative rotation between the wedge prisms $A_1$ and $A_2$. Moreover, the optical member A can also be rotatable as a whole about the optical axis.

With the above arrangement, it becomes possible to accomplish consecutively adjustable strabismus corrections in conformity to different degree and direction of strabismus of eye. Since the eyepiece of the present invention is capable of adjusting diopter without any attachment and the positive lens on the eye side is stationary regardless of diopter adjustment, the strabismic corrective optical member can be easily located behind the eyepiece. Therefore, the FIG. 5 embodiment provides a viewfinder with faculties of varying consecutively both diopter and strabismus correction. The optical member A may be detachable from behind the eyepiece. Alternatively, the optical member may be incorporated into a part of a viewfinder since the member A has an adjustable position in which the prism effect is cancelled for a person having normal eyesight. In the case where the optical member A is attachable and detachable, it can take the form of an attachment lens rotatable about the optical axis, for example, a cylindrical lens and a toxic lens for correcting astigmatism of eye in place of the form illustrated in the embodiment of FIG. 5. Since, in the past, exchange of an attachment lens was the only way to adjust diopter or abnormal refraction of eye such as strabismus or astigmatism in 35 mm single lens reflex cameras, a large number of attachment lenses were necessary to cover all possible combinations of individual differences in diopter and abnormal refraction of eye when it was desired to provide an attachment suitable for each person. In contrast, according to the present invention, the eyepiece itself has a diopter adjusting function and only the preparation of an attachment for correcting abnormal refraction of eye is sufficient with a substantial reduction in the necessary number of attachments.

Figure 6:
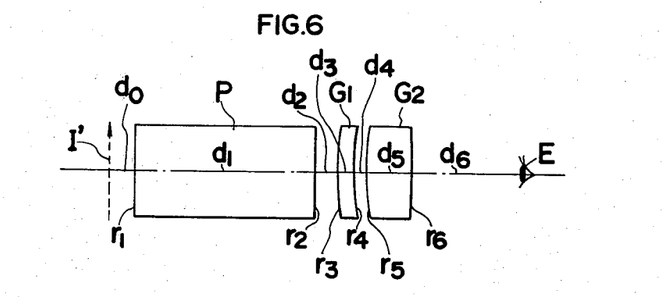
FIG. 6 is a cross-sectional view of an equivalent optical system of the embodiment of FIG. 1.
Figure 7A:
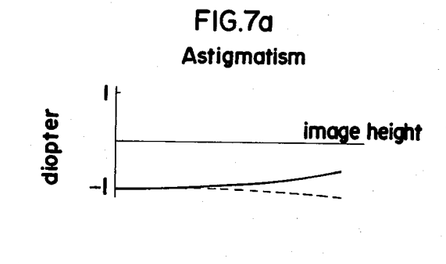
FIGS. 7 through 9 are aberration charts of a first numerical embodiment.
Figure 7B:
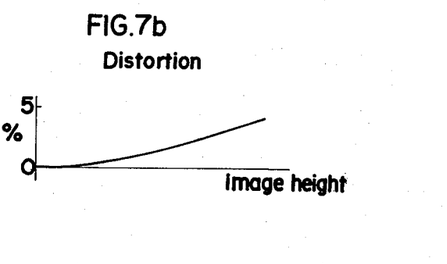
Figure 7C:
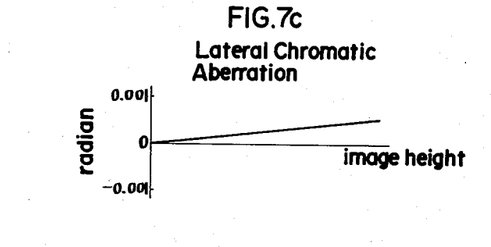
Figure 7D:
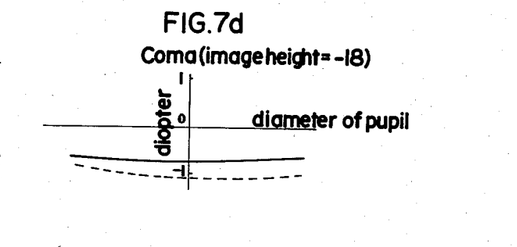
Figure 8A:
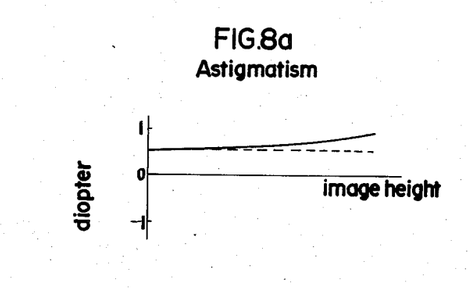
Figure 8B:
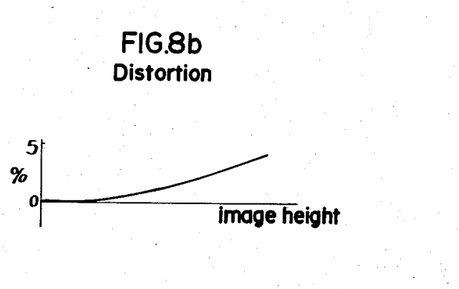
Figure 8C:
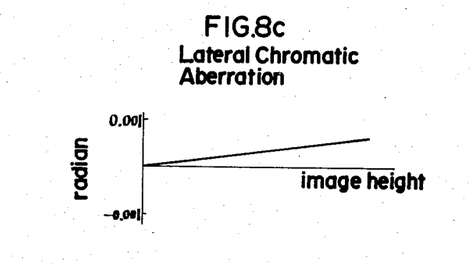
Figure 8D:
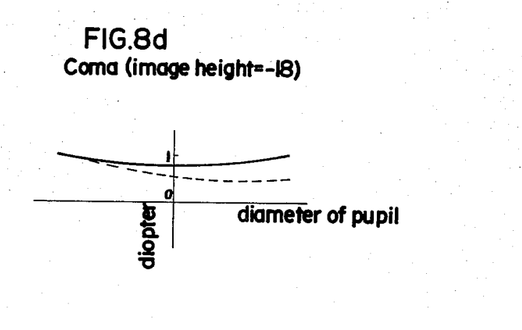
Figure 9A:
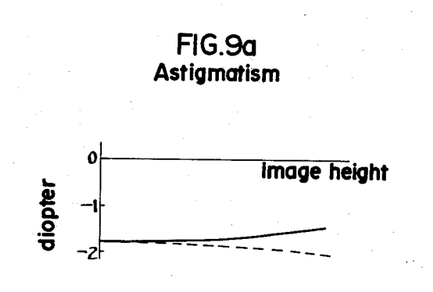
Figure 9B:
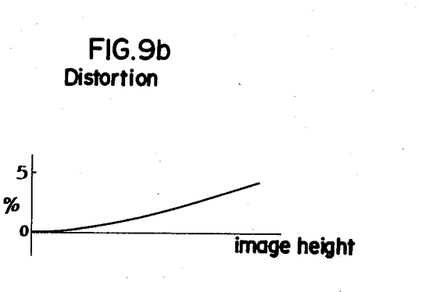
Figure 9C:
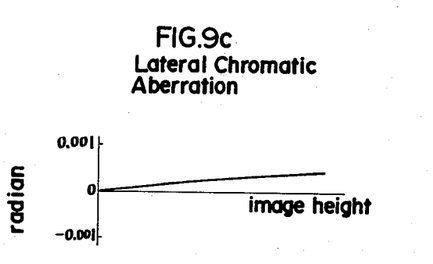
Figure 9D:
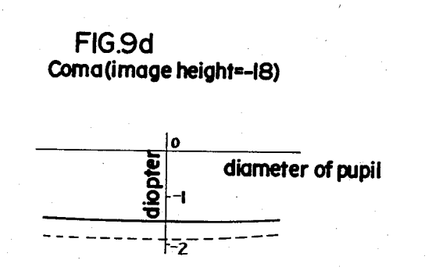
Figure 10A:
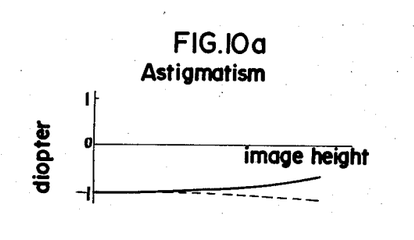
FIGS. 10 through 12 are aberration charts of a second numerical embodiment.
Figure 10B:
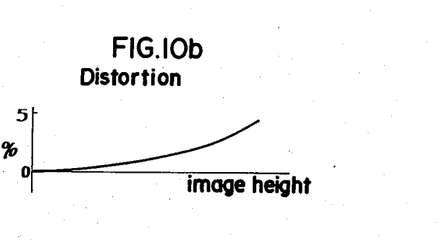
Figure 10C:
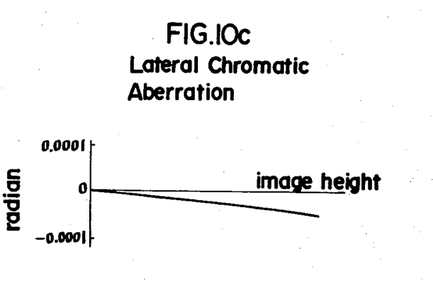
Figure 10D:
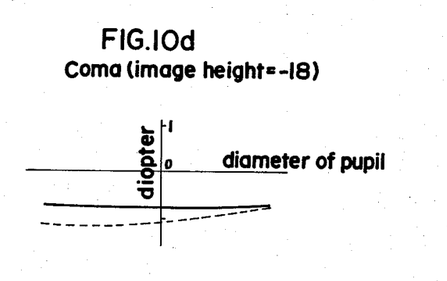
Figure 11A:
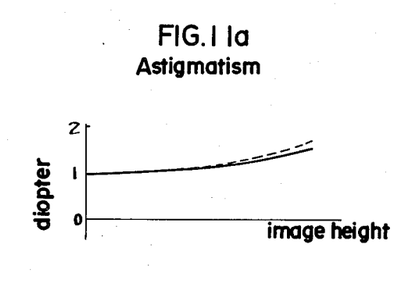
Figure 11B:
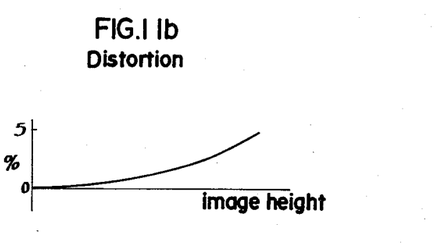
Figure 11C:
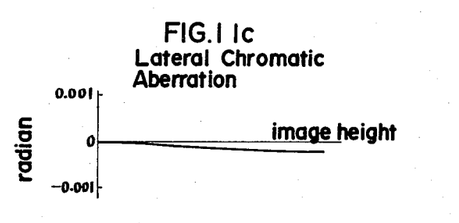
Figure 11D:
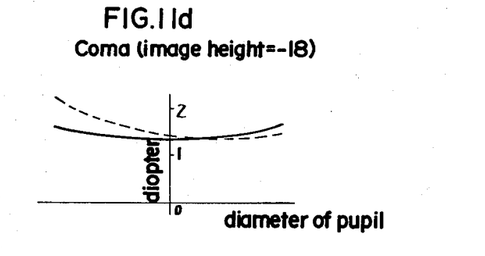
Figure 12A:
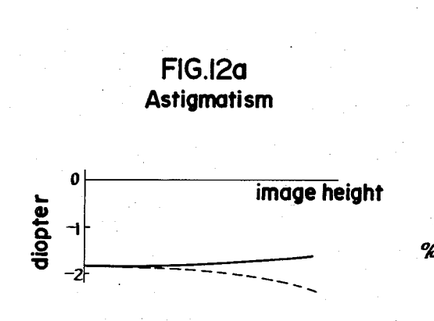
Figure 12B:
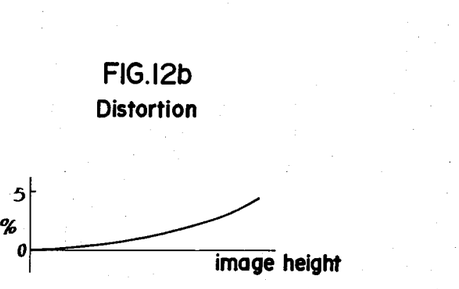
Figure 12C:
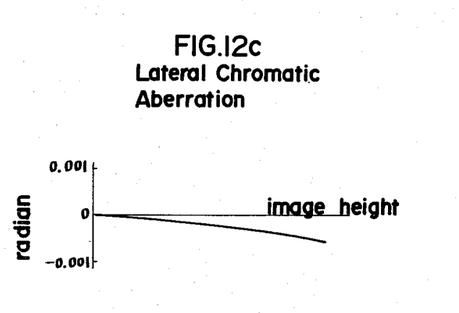
Figure 12D:
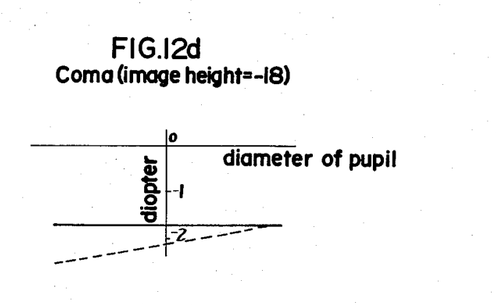

The following Tables 1 and 2 list specific representative numerical embodiments of the present invention. FIG. 6 is an equivalent diagrammatic view of FIG. 1. The numerical values given in the Tables 1 and 2 correspond to the dimensions in FIG. 6.

Table 1

Embodiment 1

| | Radius of Curvature | Axial Distance | Refractive Index | Abbe Number |
|---|---|---|---|---|
| | | $d_0$ 3.2 | | |
| P | $r_1$ ∞ | | | |
| | | $d_1$ 76.6343 | $nd_1$ 1.5168 | $\nu_1$ 64.12 |
| | $r_2$ ∞ | | | |
| | | $d_2$ 2.5 | | |
| | $r_3$ 39.149 | | | |
| $G_1$ | | $d_3$ 1.7 | $nd_2$ 1.733 | $\nu_2$ 28.24 |
| | $r_4$ 20.324 | | | |
| | | $d_4$ 1.5 | | |
| | $r_5$ 20.219 | | | |
| $G_2$ | | $d_5$ 5.5 | $nd_3$ 1.62041 | $\nu_3$ 60.29 |
| | $r_6$ −380.902 | | | |
| | | $d_6$ 17.0 | | |
| | | $\phi_1 = -0.016$ | | |

(i) When $G_1$ is located at the original position as shown in Table 1, D = −1.014 diopter, and T = 0.85 (with an objective of f = 50mm).
(ii) When $G_1$ is shifted by −2.0, i.e., $d_2 = 0.5$, $d_4 = 3.5$, D = 0.521 diopter, and T = 0.85.
(iii) When $G_1$ is shifted by +1.0, i.e., $d_2 = 3.5$, $d_4 = 0.5$, D = −1.808 diopter, and T = 0.85.

Table 2

Embodiment 2

| | Radius of Curvature | Axial Distance | Refractive Index | Abbe Number |
|---|---|---|---|---|
| | | $d_0$ 3.2 | | |
| P | $r_1$ ∞ | | | |
| | | $d_1$ 76.6343 | $nd_1$ 1.5168 | $\nu_1$ 64.12 |

Table 2-continued

| | Radius of Curvature | Embodiment 2 | | |
| --- | --- | --- | --- | --- |
| | | Axial Distance | Refractive Index | Abbe Number |
| | $r_2$ ∞ | | | |
| | | $d_2$ 2.5 | | |
| $G_1$ | $r_3$ 53.3043 | | | |
| | | $d_3$ 1.7 | $nd_2$ 1.733 | $\nu_2$ 28.24 |
| | $r_4$ 17.3644 | | | |
| | | $d_4$ 1.5 | | |
| $G_2$ | $r_5$ 18.2262 | | | |
| | | $d_5$ 5.5 | $nd_3$ 1.62041 | $\nu_3$ 60.29 |
| | $r_6$ −78.5452 | | | |
| | | $d_6$ 17.0 | | |
| | | $\phi_1 = -0.0279$ | | |

(i) When $G_1$ is located at the original position as shown in Table 2, D = −1.000 diopter, and T = 0.82.
(ii) When $G_1$ is shifted by −1.4, i.e., $d_2 = 1.1$, $d_4 = 2.9$, D = 1.005 diopter, and T = 0.82.
(iii) When $G_1$ is shifted by +0.6, i.e., $d_2 = 3.1$, $d_4 = 0.9$, D = −1.874 diopter, and T = 0.81.

In the embodiment shown in Table 1, the change in diopter was approximately 2.3 diopter when $G_1$ was shifted by 3 mm whereas in the embodiment of Table 2 the change was approximately 2.9 diopter when $G_1$ was 2 mm shifted.

FIGS. 7 through 9 are sets of aberration representations under the conditions (i), (ii) and (iii) in Table 1. FIGS. 10 through 12 are sets of aberration representations under the conditions (i), (ii) and (iii) in Table 2. These figures show that the change in diopter is effectively achieved without undesirable aberration changes. It is evident from FIGS. 7 and 10 that an eyepiece according to the present invention, is of equal or superior optical performance to the prior art in the aspect of aberration. It is also apparent from FIGS. 8, 9, 11 and 12 that any change in aberration upon movement of $G_1$ is small and does not affect the desired optical performance.

It is obvious to those skilled in the optical field that the present invention is applicable to not only a viewfinder for single lens reflex cameras but also an eyepiece with a relatively long focal length and limited space for its location.

As stated above, the present invention makes it possible to adjust diopter consecutively within a wide range in an eyepiece with a relatively long focal length upon a slight amount of movement of the lens without considerable change in magnification. No particular space is needed for movement of the lens. The diopter of a viewfinder of a single lens reflex camera is adjustable consecutively to cover any individual difference between users. The optical system of the present invention is simple in construction, inexpensive and requires no accessories for diopter adjustment. Since the lens on the eye side is stationary, the movable lens $G_1$ can be tightly sealed and closed to prevent the passage of stray light and dust into the viewfinder. Finally, the eyepiece is adjustable in diopter per se, permitting the strabismus corrective or astigmatism corrective optical member to be disposed behind the eyepiece.

While the above embodiments have been disclosed as the best mode presently contemplated by the inventor, it should be realized that these examples should not be interpreted as limiting, because artisans skilled in this field, once given the present teachings, can vary from these specific embodiments. Accordingly, the scope of the present invention should be determined solely from the following claims.

What is claimed is:

1. In a viewfinder of a single lens reflex camera having an eyepiece of positive refractive power, the improved eyepiece comprising:
   a negative lens element movable in the viewfinder along the optical axis thereof; and
   a positive lens element stationarily located at the eye side of the negative lens element,
   whereby the diopter of the viewfinder is adjustable by means of the axial movement of the negative lens element with the positive lens element left stationary.

2. The invention of claim 1, wherein the refractive power $\phi_1$ of the negative lens element is in the following range:

$$-0.04 < \phi_1 < -0.01.$$

3. The invention of claim 2, wherein the negative lens element is a negative meniscus lens convex to the object side and the eyepiece fulfills the following conditions:

$$0 < 1/r_3 \leq 0.045$$

$$0.9 \leq r_5/r_4 \leq 1.2$$

wherein $r_3$ and $r_4$ each represent a radius of curvature of the object side and eye side surfaces of the negative lens element, respectively; and $r_5$ represents a radius of curvature of the object side surface of the positive lens element.

4. The invention of claim 1, wherein the negative lens element is movable within a range less than 5 mm along the optical axis.

5. The invention of claim 1, wherein the overall focal length of the eyepiece is greater than 50 mm.

6. The invention of claim 1 further comprising a detachable member located at the eye side of the positive lens element for compensating abnormal refraction of the eye.

7. The invention of claim 6 wherein the detachable member is a composite lens having a pair of relatively rotatable prism members.

8. In an eyepiece for an optical instrument of a type having a relatively weak refractive power and a relatively limited space for its location, the improvement characterized in that, the eyepiece is divided into an object side negative lens element and an eye side positive lens element, the negative lens element being movable along the optical axis with the positive lens element left stationary, whereby an effective change in diopter is possible by means of the axial movement of the negative lens element within a limited range, in spite of the weak refractive power of the whole eyepiece.

9. The invention of claim 8, wherein the refractive power $\phi_1$ of the negative lens element is in the following range:

$$-0.04 < \phi_1 < -0.01.$$

10. The invention of claim 8, wherein the limited range of axial movement of the negative lens element for obtaining a variable diopter range greater than 2 diopters is less than 5 mm when the overall focal length of the eyepiece is greater than 50 mm.

11. The invention of claim 9 wherein the negative lens elements is a negative meniscus lens convex to the object side and the eyepiece fulfills the following conditions:

$$0 < 1/r_3 \leq 0.045$$

$$0.9 \leq r_5/r_4 \leq 1.2$$

wherein $r_3$ and $r_4$ each represent a radius of curvature of the object side and eye side surfaces of the negative lens element, respecitvely; and $r_5$ represents a radius of curvature of the object side surface of the positive lens element.

12. In an improved viewfinder for a single lens reflex camera capable of compensating for individual users variances in diopter and abnormality of eye refraction, the improvement comprising:
 a negative lens element;
 a positive lens element positioned on the eye side of the negative lens element, the negative lens element movable along an optical axis to adjust the diopter of the viewfinder, and
 a pair of relatively rotatable prisms capable of providing individual correction of any abnormal refraction of the eye.

13. The invention of claim 12, wherein the negative lens element is a negative meniscus lens convex to the object side and the viewfinder fulfills the following conditions:

$$-0.04 < \phi_1 < -0.01$$

$$0 < 1/r_3 = 0.045$$

$$0.9 \leq r_5/r_4 \leq 1.2$$

wherein
 $r_3$ and $r_4$ each represent a radius of curvature of the object side and eye side surfaces of the negative lens element, respectively;
 $r_5$ represents a radius of curvature of the object side surface of the positive lens elements, and $\phi_1$ is the refractive power of the negative lens element.

* * * * *

UNITED STATES PATENT AND TRADEMARK OFFICE
CERTIFICATE OF CORRECTION

PATENT NO. : 4,217,048

DATED : August 12, 1980

INVENTOR(S) : Takeshi Egawa

It is certified that error appears in the above—identified patent and that said Letters Patent is hereby corrected as shown below:

Column 1, line 62, delete "refined" and insert --defined--.

Column 3, lines 65-66, delete "Difference" and insert --Differences--.

Column 4, line 67, after "movable" insert --negative--.

Column 6, line 20, delete "toxic" and insert --toric--.

Column 6, line 57, after "and" delete "T= 0.85" and insert --$\Gamma$ = 0.85--.

Column 6, line 58, after "diopter, and" delete "T - 0.85" and insert --$\Gamma$ = 0.85".

Column 6, line 60, delete "T = 0.85" and insert --$\Gamma$ = 0.85--.

Column 7, line 16, delete "T = 0.82" and insert --$\Gamma$ = 0.82--.

Column 7, line 17, delete "T = 0.82" and insert --$\Gamma$ = 0.82--.

Column 7, line 19, delete "T = 0.81" and insert --$\Gamma$ = 0.81--.

Column 10, line 18, delete "elements" and insert --element--.

Signed and Sealed this

Twelfth Day of May 1981

[SEAL]

Attest:

RENE D. TEGTMEYER

Attesting Officer — Acting Commissioner of Patents and Trademarks